Figure 1:
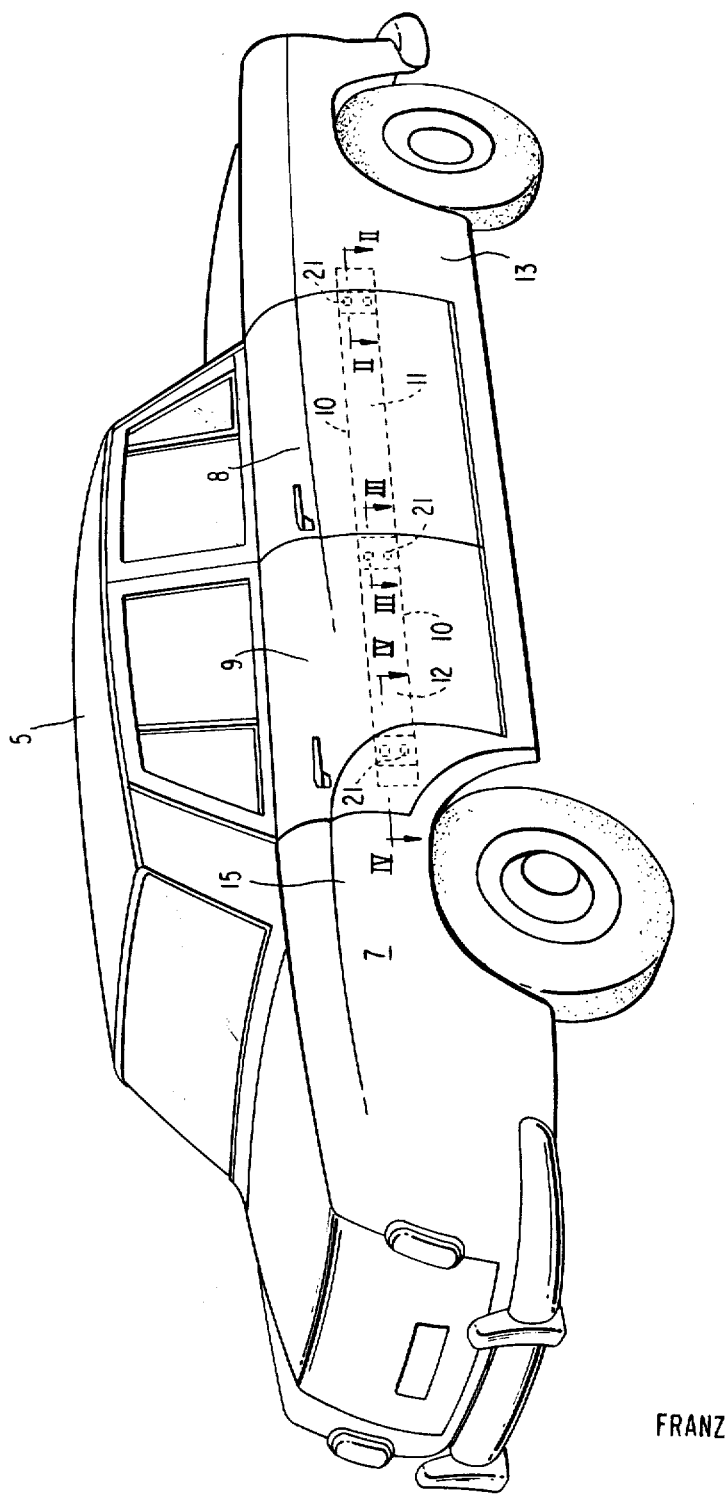

United States Patent [19]
Deckert

[11] 3,887,227
[45] June 3, 1975

[54] INSTALLATION FOR THE PROTECTION OF MOTOR VEHICLE BODIES AGAINST LATERAL IMPACTS

[75] Inventor: Franz Deckert, Sindlefingen, Germany

[73] Assignee: Daimler-Benz Aktiengesellschaft, Germany

[22] Filed: Oct. 14, 1971

[21] Appl. No.: 189,093

Related U.S. Application Data

[63] Continuation of Ser. No. 872,823, Oct. 31, 1969, abandoned.

[30] Foreign Application Priority Data
Nov. 2, 1968 Germany.............................. 1806716

[52] U.S. Cl................... 296/28 R; 49/367; 49/501; 296/146
[51] Int. Cl. ........................................... B60r 21/02
[58] Field of Search................. 296/152, 146, 28 R; 49/367, 366, 369, 368, 501, 371; 293/62, 63; 16/137; 292/DIG. 39, DIG. 40

[56] References Cited
UNITED STATES PATENTS

| | | | |
|---|---|---|---|
| 2,080,714 | 5/1937 | Hicks et al. | 296/146 |
| 2,354,700 | 8/1944 | Pezzano | 293/63 X |
| 2,785,921 | 3/1957 | Barenyi | 296/28 |
| 3,110,515 | 11/1963 | Loftin | 293/63 X |
| 3,363,934 | 1/1968 | Peters | 296/28 R |

*Primary Examiner*—David Schonberg
*Assistant Examiner*—John A. Pekar
*Attorney, Agent, or Firm*—Craig & Antonelli

[57] ABSTRACT

An installation for the protection of motor vehicle bodies against lateral impacts in which at least one tension member extending in the longitudinal direction is provided within the area of the passenger space which reinforces the lateral wall of the body and is adapted to convert the impact forces into tension forces.

48 Claims, 4 Drawing Figures

INVENTOR
FRANZ DECKERT

INSTALLATION FOR THE PROTECTION OF MOTOR VEHICLE BODIES AGAINST LATERAL IMPACTS This is a continuation, Ser. No. 872,823, filed Oct. 31, 1969 now abandoned.

The present invention relates to an installation for the protection of motor vehicle bodies against lateral impacts.

The vehicle passengers are protected against frontal impacts or collisions by various installations, for example, by the bumper supported on the vehicle frame, thereupon by the front section with engine and engine suspension itself, and finally by the dashboard and padded instrument panel. The same conditions exist analogously at the rear section of the vehicle. In contradistinction thereto in case of lateral impact, the protection is less and grave injuries which are frequently fatal, may be suffered by the passengers.

Known impact-protection installations are arranged at the longitudinal side of the vehicle at the bottom edge of the vehicle body, approximately at the height of the vehicle frame and/or the bumper. The prior art protective installations consist, for the most part, of rails projecting beyond the outer configuration of the doors or of the lateral walls, which are supported in rubber bodies and which are stressed during impacts in bending by the pressure forces. Other known rails are mounted as short deflecting bodies on the outer panel of the vehicle side walls. They do not produce an adequate protection. Door bodies reinforced in a known manner by box-shaped rails are heavy in weight. A far-reaching destruction of the vehicle body is lessened by these measures, however, an increased danger to the passengers occurs after the impact as a result of the reaction or rebound effect.

The present invention is concerned with the task to avoid the disadvantages described above. A light-weight and effective protection, easy to manufacture, is to be achieved. The present invention solves the underlying problems in that the side wall of the body disposed within the area of the vehicle passenger space is reinforced by at least one tension member extending in the longitudinal direction which is adapted to be securely connected in front and in the rear with reinforced parts of the front section and rear section of the vehicle. Thus, the general concept of the present invention resides in that the forces occurring during a lateral impact are converted into tension forces. These tension forces are then absorbed by reinforced columns or the like.

The proposed installation of the present invention produces quite a considerable reinforcement of the lateral vehicle walls. This is achieved not only by mere reinforcement, i.e., by a weight increase, but also by a different type of loading or stressing. Consequently, the installations in accordance with the present invention are also light in weight and entail no considerable increase in the over-all weight.

In an advantageous type of construction according to the present invention, the tension member or members are subdivided corresponding to the door arrangement and the parts, with closed door, are adapted to be securely engaged with one another as well as in front and to the rear thereof. A further feature of the present invention resides in the fact that a tension member extends approximately at the level of the belt-line of the vehicle and possibly a still further tension member extends in the lower area.

A preferred type of construction of the inventive concept with four-door motor vehicles essentially consists in that the tension member of a vehicle side is divided at the center column and in that each tension member section is reinforced at the forward end with eye or lug-plates and is provided at the rear end with claw plates having hooks projecting inwardly transversely to the door outer cover whereby the eye-plate of the rear door with its forward portion having the eye or lug surrounds inwardly the engaging claw at the rear end of the forward door. The ends of the tension member sections are detachably hooked-in in a similar manner into the vehicle front section and into the vehicle rear section. It is then further proposed in connection therewith that a striker-shaped engaging hook, extending transversely outwardly, is secured at strong structural parts in the front section approximately at the level of the door joint and that an angularly shaped receiving or catch plate with eye or lugs for the engaging hooks of the engaging plate is securely arranged at the rear end of the rear door on also strong mounting parts of the vehicle rear section.

The tension member consists appropriately of band steel. It may also be reinforced by indentation of one or several longitudinal grooves or by turned edges. However, the tension member may also consist of a strong wire cable or of several thin wire cables arranged one above the other and mutually twisted or intertwined, whereby engaging claws and receiving eyes are provided at the ends in the same or similar form.

For purposes of increasing the bending rigidity of the tension member, it may be constructed also in accordance with the present invention of an approximately hat-shaped cross section or may be constructed approximately box-shaped or as a quadrangular pipe whereby the respective web height is to correspond to the permissive bending width. Instead of tension bands made from steel, straps made of synthetic resinous material, for example of nylon, may be used which are adapted to be stressed in tension and are mutually interconnected. Finally, in lieu of the tensional bands also reticular or net-shaped strip sections may be mutually inter-engaged and may be detachably hooked into fixed vehicle parts of the front section and of the rear section. In order to be able to absorb the impact forces oftentimes of a magnitude of several tons, it is appropriate to permit the bending deformability of the door outer panel together with the bending resistance of the tension member to be effective as first counter-force. For that reason, according to a further feature and development of the inventive concept, the ends of the tension member are advantageously hooked with large play into the fixed structural parts of the vehicle body and with a subdivided tensional member, are hooked into one another with large play. Only after a corresponding bending deformation of the vehicle or door outer body panel, the lateral impact force is converted by the band or tension member into tension forces which are absorbed by the fixed vehicle parts. The part of the installation converting the impact force into tension force, the tension member and its detachable anchoring may possess all technically possible and economically defensible types of construction.

During an impact against the vehicle side wall at the level of the passenger space, at first the outer panels of the door of this side are pressed-in somewhat and a first portion of the impact effect is absorbed thereby by deformation work until the play at the engaging places of the sections of the tension member are dissipated at the vehicle front section and rear section. The main impact forces thereafter converted into tensional forces are absorbed by the fixed parts of the vehicle front and rear sections and/or by the other structural parts.

Accordingly, it is an object of the present invention to provide an installation for the protection of motor vehicle bodies against lateral impacts which eliminates by simple means the aforementioned shortcomings and drawbacks encountered in the prior art.

Another object of the present invention resides in an installation for the protection of motor vehicle bodies against lateral impacts which effectively protects the vehicle passengers from serious injuries.

A further object of the present invention resides in an installation for the protection of motor vehicle bodies which not only effectively protects the passengers against serious injuries due to lateral impacts but is simple in construction, relatively easy to install and only insignificantly increases the weight of the vehicle.

Still a further object of the present invention resides in an installation for the protection of motor vehicle bodies against lateral impacts which effectively converts the lateral impact forces into tension forces that are effectively absorbed by reinforced parts of the vehicle.

Figure 2:
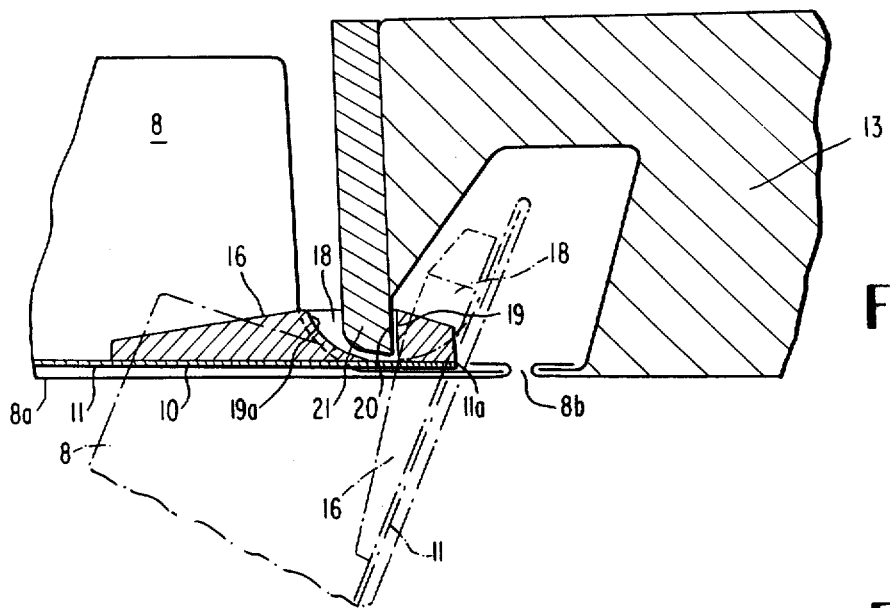
Figure 3:
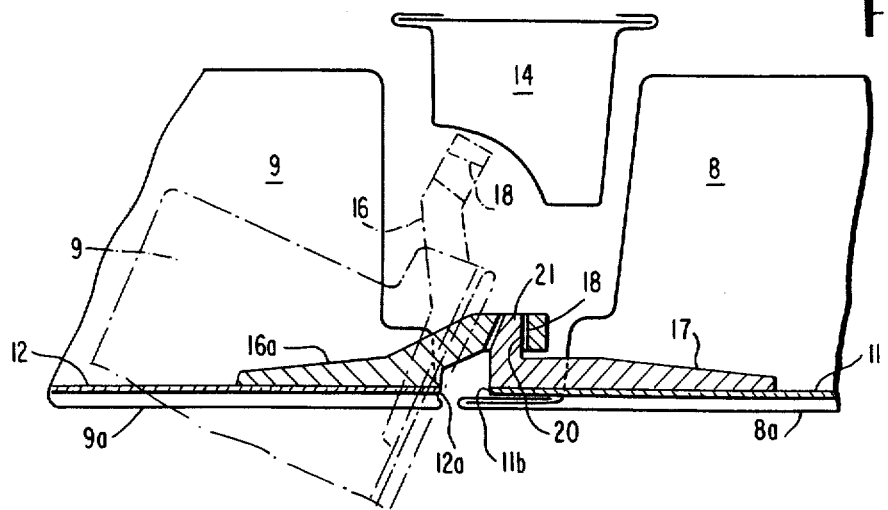
Figure 4:
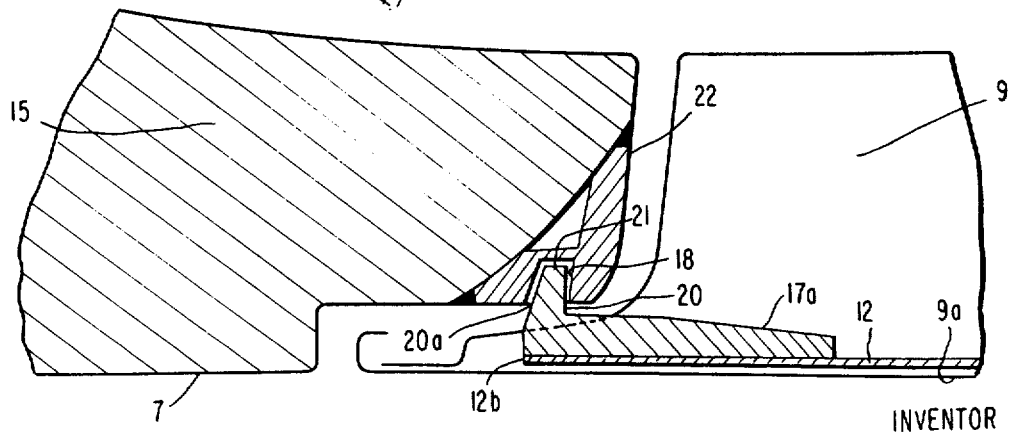

These and further objects, features and advantages of the present invention will become more obvious from the following description when taken in connection with the accompanying drawing which shows, for purposes of illustration only, one embodiment in accordance with the present invention, and wherein:

FIG. 1 is a perspective side view of a motor vehicle in accordance with the present invention; and FIGS. 2 to 4 are somewhat schematic partial cross-sectional views, on an enlarged scale through the ends of the tension member installed into the doors and taken along lines II—II, III—III and IV—IV in FIG. 1, respectively.

Referring now to the drawing wherein like reference numerals are used throughout the various views to designate like parts, the passenger motor vehicle 5 according to FIG. 1 is provided at the side wall 7 of the passenger space with a two-partite tension member 10 which extends over the full width of the doors 8 and 9 and is disposed close to the outer covering panels 8a and 9a thereof (see FIGS. 2 to 4). The tension member 10, for example, in the form of a band extends into the front section 13 and into the rear section 15 of the vehicle. The tension member 10 (see FIGS. 2 to 4) consists of the two sections 11 and 12, of which the forward section 11 of the tension member 10 at the forward end 11a thereof is loosely hooked in with an eye plate 16 (FIG. 2) into strong securing or mounting parts of the vehicle front section 13. The forward section 11 of the tension member 10 extends over the full width of the front door 8. Its rear end 11b according to FIG. 3 is loosely hooked-in into the rear section 12 of the tension member 10 at the forward end 12a thereof approximately in the plane of half the thickness of the center column 14 arranged in the side wall 7. The rear end 12b (FIG. 4) of the rear tension member section 12 is loosely hooked-in into reinforcing parts of the rear vehicle section 15. Both tension member sections 11 and 12 are disposed at a small distance to the corresponding outer cover panel 8a and 9a of the door 8 and 9 and may be fastened at or attached to the same or in apertures thereof. Its ends 11a, 11b and 12a, 12b are reinforced by eye plates 16 and 16a and claw plates 17 and 17a. The eye or lug plate 16 is constructed at the forward end 11a of the forward tension member section 11 approximately of double trapezoidal shape. This plate 16 has two eyes or lugs 18 approximately at the level of its greatest thickness. The eyes 18 have in the forward direction a smooth, flat abutment wall 19 bent at right angle to the outer cover panel whereas the rear wall 19a thereof is curved forwardly and outwardly so that the eye cross section continuously decreases toward the outside. This type of eye-aperture facilitates the moving in and moving out of the hook into the eyes during opening and closing of the door. Of the claw plate 17 at the rear end of the tension member 11 and 12, the front side 20 of the engaging hooks 21 thereof is appropriately directed also transversely to the outer cover panel 8a and 9a.

With a closed door, each of the approximately stricker shaped engaging hooks 21 which is secured at the structural parts of the front section 13 approximately at the level of the door joint 8b and which projects transversely outwardly, engages with large play into one of the eyes 18 at the tension member section 11. Each hook 21 is disposed with its flat surface 20 at a small distance opposite the abutment wall 19 of the eye 18. Each hook 21 is provided with a back side curved approximately similarly as the backward eye wall 19a, from which it is separated at approximately the same distance as its flat counter surface from the forward eye abutment wall 19. A claw plate 17 is secured at the rear end 11b of the one tension member section 11. Two engaging hooks 21 project from the plate 17 at moderate spacing from one another approximately at right angle toward the inside in the direction toward the center column 14. The hooks 21 thereby extend with large play through the eyes 18 of an eye plate 16a which are provided with apertures of a shape approximately complementary to that of the hooks 21. The eye plate 16a is secured at the forward end 12a of the rear tension member section 12; its forward end is bent inwardly by the thickness of the claw plate 17 and covers the rear end thereof. The forward surface 20 of the hooks 21 as the forward aperture surface 19 of the eyes 18 in the plate 16a may be flattened off and may be disposed approximately at right angle to the door outer panel 8a.

The rear tension member section 12 (FIG. 4) extends over the full width of the rear door 9 or with a two-door motor vehicle over a rear part of the side wall 7. The tension member section 12 is loosely hooked-in with its forward end 12a at the level of the center column 14 into the forward tension member section 11 and engages with its rear end 12b into strong receiving means provided at fixed structural parts of the rear section 15 of the vehicle.

The construction of these fixed structural parts is not indicated in detail herein since they can be of any conventional construction with the exception of a strong angle plate 22 which serves for the reception and as abutment for the hooks 21 that projects inwardly at the rear end of the claw plate 17a at right angle to the outer cover panel 9a of the door. Each hook 21 engages with a closed door also with a large play of its flanks 20 and 20a into the corresponding eyes 18 of the angle plate 22.

An impact on the vehicle side causes by the bending of the outer panels 8 and 9 and of the threshold and/or of one of the columns possibly also loaded or stressed at the same time, the tension member sections 11 and 12 to hook form-lockingly into one another to form a continuous tension member 10 extending from in front to the rear. The forces are introduced by the tension member 10 into the mounting parts 21 and 22 of the front section 13 and of the rear section 15 by means of which they are effectively absorbed.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are within the scope of those skilled in the art.

I claim:

1. An installation for the protection of motor vehicle bodies against lateral impacts, characterized in that a wall means of the body disposed within the passenger space is reinforced by at least one tension means extending in the longitudinal direction, said tension means being securely connected in front and in the rear thereof with reinforced parts of the front and rear portion of the vehicle, said tension means being at least one tension member for converting substantially all lateral impact forces against said at least one tension member into tensional forces to be absorbed by said reinforced parts.

2. An installation according to claim 1, characterized in that the tension means are subdivided into sections corresponding to the door arrangement of the vehicle, and in that these sections are securely engaged one with the other when the doors are closed so as to transfer the tensional impact forces to the reinforced parts at the front and rear sections of the vehicle.

3. An installation according to claim 2, characterized by detachable connecting means for connecting the sections of the subdivided tension means with each other and with the respective structural parts.

4. An installation according to claim 3, characterized in that the connections between the sections contain gaps to permit some distortion of the vehicle side prior to the rigid connection thereof.

5. An installation according to claim 1, characterized in that the tension means is formed by at least one tensional band, said tensional band being relatively thin with respect to the wall thickness of the vehicle side.

6. An installation according to claim 5, characterized in that the tension means is constructed as steel band with high tensional rigidity.

7. An installation according to claim 6, characterized in that the tensional band is provided with reinforcing means.

8. An installation according to claim 1, characterized in that one tension means extends approximately midway between the bottom of the windows and the bottom of the vehicle side.

9. An installation according to claim 8, characterized in that an additional tension means extends also within the the lower area of the vehicle just above the bottom of the vehicle side.

10. An installation according to claim 1, with a four-door motor vehicle, characterized in that the tension means at a vehicle side is subdivided into sections at a center column between the doors, and in that each section of the tension means is reinforced at one end with eye-plate means and at the other end with claw-plate means having inwardly extending hook means, the claw-plate means of one section being interengageable with the eye-plate means of the other section.

11. An installation according to claim 10, characterized in that the hook means extend substantially transversely to the outer cover panel of a door.

12. An installation according to claim 10, characterized in that the eye-plate means of one section surrounds inwardly with one part thereof by means of its eye the claw-plate means of the other section.

13. An installation according to claim 10, characterized in that an eye plate means is provided at a forward end of a subdivided section of the tension means and a claw-plate means is provided at the rear end of a corresponding section, whereby the eye plate means of the rear section surrounds inwardly by means of its forward portion having the eye the claw-plate means at the rear end of the forward section.

14. An installation according to claim 13, characterized in that approximately at the door joint an approximately striker-shaped engaging hook means projecting outwardly is secured adjacent the forward end of the front section on strong structural parts of the vehicle, and in that an angularly shaped receiving plate means with eye means for the engaging hook means of the engaging plate means is securely arranged adjacent the rear end of the rear door also at strong structural mounting parts of the vehicle.

15. An installation according to claim 14, characterized in that with closed doors, the hook means of the engaging plate means at the ends of the sections of the tension means engage into the eyes of the eye plate means with large play.

16. An installation according to claim 15, characterized in that the tension means is constructed as steel band with high tensional rigidity.

17. An installation according to claim 16, characterized in that the tensional band is provided with reinforcing means.

18. An installation according to claim 17, characterized in that the reinforcing means are formed by longitudinal ribs.

19. An installation according to claim 17, characterized in that the reinforcing means are constituted by narrow edges bent approximately in the shape of a hat.

20. An installation according to claim 17, characterized in that the reinforcing means are formed by a box-shaped cross section with short webs.

21. An installation according to claim 17, characterized in that the reinforcing means are formed by a tube-shaped cross section with short webs.

22. An installation according to claim 10, characterized in that approximately at the door joint an approximately striker-shaped engaging hook means projecting outwardly is secured adjacent the forward end of the front section on strong structural parts of the vehicle, and in that an angularly shaped receiving plate means with eye means for the engaging hook means of the engaging plate means is securely arranged adjacent the rear end of the rear door also at strong structural mounting parts of the vehicle.

23. An installation according to claim 22, characterized in that with closed doors, the hook means of the engaging plate means at the ends of the sections of the tension means engage into the eyes of the eye plate means with large play.

24. An installation according to claim 10, characterized in that the tension means is located approximately midway between the bottom of the window and the bottom of the doors.

25. An installation according to claim 24, characterized in that additional tension means are located below the bottom of the door.

26. An installation according to claim 1, characterized in that the connections between the tension means and the reinforcement parts contain gaps to permit some distortion of the vehicle side prior to the rigid connection of the tension means and the reinforcement parts.

27. An installation for the protection of motor vehicle bodies against lateral collision impacts comprising at least two deformationally rigid parts spaced longitudinally along at least one side of the vehicle, tension means including at least one tension band member extending between said rigid parts for converting lateral impact forces against said at least one tension band member into tensional forces to be absorbed by said rigid parts, and connecting means for connecting the ends of said tension band member to the respective rigid parts to transfer all lateral collision forces impinging on said tension band member to said rigid parts by way of the band member stressed in tension thereby.

28. An installation according to claim 27, characterized in that each tension means is positioned between inner and outer wall panels of the vehicle.

29. An installation according to claim 28, characterized in that a respective tension means extends along portions of a passenger door provided at the side of the vehicle.

30. An installation for the protection of motor vehicle bodies against lateral collision impacts comprising at least two anchoring parts longitudinally spaced along at least one side of the vehicle, tension means including at least one relatively thin tension member extending between said anchoring parts for converting lateral impact forces against said at least one relatively thin tension member into tensional forces to be absorbed by said anchoring parts, and connecting means for exclusively connecting said tension member at the ends thereof to the respective rigid parts to transfer lateral collision forces impinging against said tension member to said anchoring parts by way of the tension member which is stressed thereby in tension so that such lateral forces are absorbed at least primarily by said anchoring parts.

31. An installation according to claim 30, characterized in that each tension means is positioned between inner and outer wall panels of the vehicle.

32. An installation according to the claim 30, characterized in that each tension means extends along portions of a passenger door provided at the side of the vehicle.

33. An installation according to claim 30, for a motor vehicle with a vehicle side door having an outer door panel, wherein said tension member is disposed closed behind the outer door panel, extends freely over at least a major portion of the length of the door and is secured only at its ends to said anchoring parts.

34. An installation for the protection of motor vehicle bodies and the occupants thereof against lateral collision impacts comprising tension means extending in the longitudinal direction of the vehicle at least across the zone of at least one side door provided on the vehicle, and connecting means for connecting the tension means to adjacent vehicle body parts, said tension means including at least one tensile stress member extending through the side door and terminating outside of said door, said connecting means connecting said member to respective adjacent vehicle body parts such that substantially all lateral collision forces acting on said member are transferred as tension forces along said member to said respective adjacent vehicle body parts.

35. An installation according to claim 34, characterized in that said member extends through a front transverse face of a front side door.

36. An installation according to claim 34, characterized in that said at least one side door includes a door with a first transverse face adjacent a locking means and opposite a second transverse face adjacent a hinge means, said member including a coupling means for anchoring in body parts adjacent the first face.

37. An installation according to claim 36, characterized in that the body parts adjacent said first face include a door post within which said coupling means anchors said member.

38. An installation according to claim 36, characterized in that said member is anchored at a door post adjacent said second transverse face.

39. An installation according to claim 36, characterized in that said coupling means includes a hook and eye interengageable with one another.

40. An installation according to claim 39, characterized in that the coupling means is disposed in such a manner that, in case of a lateral impact on the vehicle, a force occurs which is effective in the engagement direction of the hook and eye.

41. An installation according to claim 39, characterized in that the hook and eye are aligned when the door is closed such that, with a closed door, said hook and eye are automatically interengaged in the case of a lateral impact on the vehicle.

42. An installation according to claim 34, characterized in that said tension means includes a plurality of tensile stress members extending through the at least one side door.

43. An installation according to claim 34, characterized in that said at least one said tensile stress member is constructed as a strong wire cable.

44. An installation according to claim 43, characterized in that said at least one said tensile stress member is constructed as a strap made of synthetic resinous material.

45. An installation according to claim 44, characterized in that said synthetic resinous material is nylon.

46. An installation according to claim 43, characterized in that said at least one said tensile stress member is constructed as a profiled bar.

47. An installation according to claim 43, characterized in that said at least one said tensile stress member is constructed as several thin wire cables mutually intertwined.

48. An installation for the protection of a four-door motor vehicle body against lateral impacts, characterized in that a wall means of the body disposed within the passenger space is reinforced by at least one tension means extending in the longitudinal direction, said tension means being securely connected in front and the rear thereof with reinforced parts of the front and rear portion of the vehicle, said tension means being at least one tension member operable to convert lateral impact forces into tensional forces to be absorbed by said reinforced parts, and characterized in that the tension means at a vehicle side is subdivided into sections at a center column between the doors, and in that each section of the tension means is reinforced at one end with eye-plate means and at the other end with claw-plate means having inwardly extending hook means, the claw-plate means of one section being interengageable with the eye-plate means of the other section.

* * * * *